(No Model.)

A. AYMOND & H. LA RUE.
NUT LOCK.

No. 407,317. Patented July 23, 1889.

Witnesses:
L. C. Hills,
W. A. Duvall

Alph Aymond
and Henry La Rue,
Inventors.

E. B. Stocking
Attorney.

UNITED STATES PATENT OFFICE.

ALPH AYMOND AND HENRY LA RUE, OF ST. CHARLES, MISSOURI.

NUT-LOCK.

SPECIFICATION forming part of Letters Patent No. 407,317, dated July 23, 1889.

Application filed October 2, 1888. Serial No. 286,989. (No model.)

*To all whom it may concern:*

Be it known that we, ALPH AYMOND and HENRY LA RUE, citizens of the United States, residing at St. Charles, in the county of St. Charles, State of Missouri, have invented a certain new and useful Improvement in Nut-Locks, of which the following is a specification, reference being had therein to the accompanying drawings.

This invention has relation to nut-locks; and it consists in an improvement upon that class of nut-locks which involve the use of a binding-pin inserted in the margin of the threaded bore of the nut and adapted to bear upon the bolt.

The invention consists in certain features of construction hereinafter described, and particularly pointed out in the claims.

Figure 1:
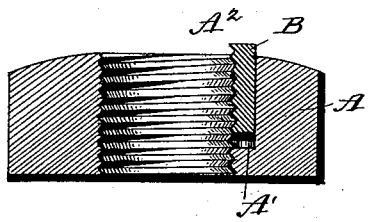
Figure 2:
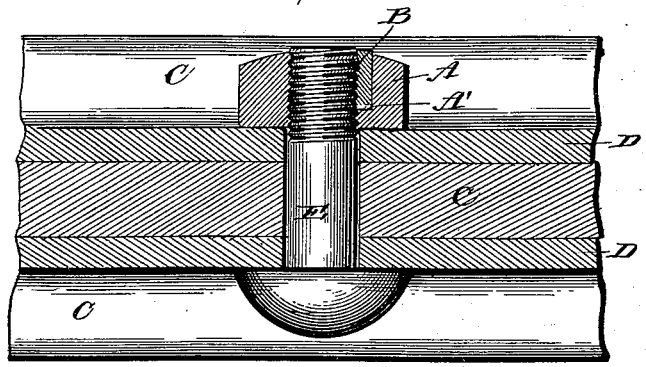
Figure 3:
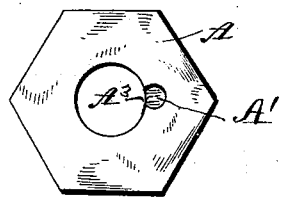

Referring to the drawings, Figure 1 is a vertical transverse section of a nut embodying our invention. Fig. 2 is a horizontal section of portions of a rail-joint provided with our improvement. Fig. 3 is a plan of a nut and binding-pin.

Like letters refer to like parts in all the figures.

A represents a nut of any ordinary construction, except that it is provided with a recess A', bored or otherwise formed parallel with the main bore $A^2$ of the nut and in such proximity thereto as to leave a slot or opening $A^3$, giving communication from the recess to the main bore. The outline in cross-section of the recess A' may be any desired; but for convenience in forming the same a cylindrical outline is perhaps preferable. A pin B, of steel or other hard metal, or it may be of brass or other soft metal, is snugly fitted to the recess A', and in length is somewhat less than the depth of the recess A'.

The pin is preferably seated in the recess, with its lower end some distance from the bottom of the recess and its upper end projecting above the front or outer face of the nut. This arrangement of the pin is preferably made before the threads are cut in the main bore $A^2$ of the nut, so that that portion of the pin B which projects through the slot $A^3$ is threaded simultaneously with threading the nut itself. It will be noted, also, that whatever portion of the pin there is projected beyond the front or outer face of the nut and toward the bore thereof is also threaded at the same time.

C represents a rail, D fish-plates, and E a bolt adapted to fit the nut A.

The manner of using our nut-lock is as follows: The nut, with the pin projecting from its front or outer face, is first run down the bolt until its back or inner face abuts squarely and firmly against the fish-plate. Then by means of a hammer or any other convenient tool the pin B is driven into the recess A', thereby forcing it with great firmness against the adjacent portions of the threads of the bolt and holding the nut from disengagement in any unintended manner. If the pin be of steel or other hard metal, it will materially upset or mar the threads of the bolt, so as to render the removal of the nut difficult, but at the same time possible, accompanied with more or less damage to the threads of the bolt, while if the pin be of brass or other soft metal the nut may be removed with little or no damage to the threads of the bolt. The outer end of the pin B may be either convex, flat, or any other shape in cross-section, as it serves no function except as a driving-face for the pin.

Although shown in connection with rails and fish-plates, it is clearly understood that the contemplated use of our nut-lock is not limited in any particular. The tightness of the seat of the pin in the recess should be merely such as to enable the threads to be cut in the exposed portion of the pin.

Heretofore a binding-pin has been applied to the nut, with its end projecting through and beyond what we have designated the inner "face" or "back" of the nut, in order that the pin may be forced home by coming in contact with the fish-plate in the act of tightening the nut upon the bolt. In this construction it is apparent that the inner or back face of the nut cannot be brought into firm contact with the fish-plate except during a movement of the binding-pin, so that the latter is marring or cutting the threads of the bolt in such a manner as to form a path on the threads of the bolt, which each thread on the pin will naturally and easily follow back, permitting the nut to become loosened on the bolt. In other words, the greater or less abrasion of the bolt, caused by the threads in the binding-pin, takes place along the threads of the bolt when the pin is driven in the act of turning the nut down on the bolt, instead of said abrasion, necessary to hold the nut, being wholly across the threads of the bolt, as when the pin is driven to its seat, to bind on the threads after the nut is seated.

Having described our invention, what we claim is—

1. A nut provided with a recess adjacent and communicating with its central or main bore and with a pin fitted in the recess and projecting from the outer face of the nut, said pin being provided with threads substantially coincident with the threads of the nut, substantially as specified.

2. A nut provided with a cylindrical recess adjacent and communicating with its central or main bore and with a cylindrical pin fitted in the said recess and projecting from the outer face of the nut, said cylindrical pin being provided with threads coincident with the threads of the nut, substantially as specified.

In testimony whereof we affix our signatures in presence of two witnesses.

ALPH AYMOND.
HENRY LA RUE.

Witnesses:
   JOS. H. ALEXANDER,
   GUSTAV HACKMANN.